(12) United States Patent
Escure et al.

(10) Patent No.: US 6,648,592 B2
(45) Date of Patent: Nov. 18, 2003

(54) CENTRIPETAL AIR-BLEED SYSTEM

(75) Inventors: Didier René André Escure, Nandy (FR); Patrick Didier Michel Lestoille, Fontainebleau (FR); Gérard Gabriel Miraucourt, Brie Comte Robert (FR); Pascal Didier Vareille, Evry (FR)

(73) Assignee: Snecma Moteurs (FR)

( * ) Notice: Subject to any disclaimer, the term of this patent is extended or adjusted under 35 U.S.C. 154(b) by 0 days.

(21) Appl. No.: 10/157,887

(22) Filed: May 31, 2002

(65) Prior Publication Data

US 2002/0182059 A1 Dec. 5, 2002

(30) Foreign Application Priority Data

May 31, 2001  (FR) .............................. 01 07121

(51) Int. Cl.⁷ ................................ F01D 5/08
(52) U.S. Cl. ...................... 415/115; 415/119
(58) Field of Search .................. 415/115, 116, 415/119; 416/500

(56) References Cited

U.S. PATENT DOCUMENTS

| 3,844,110 A | * | 10/1974 | Widlansky et al. ........ 60/39.08 |
| 4,415,310 A | | 11/1983 | Bouiller et al. |
| 4,595,339 A | | 6/1986 | Naudet |
| 4,787,820 A | | 11/1988 | Stenneler et al. |
| 4,815,272 A | * | 3/1989 | Laurello ....................... 60/806 |
| 5,267,832 A | * | 12/1993 | Johnson et al. ............. 415/115 |
| 5,472,313 A | | 12/1995 | Quinones et al. |

FOREIGN PATENT DOCUMENTS

FR         2672943        8/1992

* cited by examiner

Primary Examiner—Ninh H. Nguyen
(74) Attorney, Agent, or Firm—Bacon & Thomas, PLLC

(57) ABSTRACT

A centripetal-flow airbleed system for a gas-turbine engine including an annular support affixed to first and second disks of a compressor of the engine and having a plurality of peripherally spaced orifices defined along the radius thereof, a plurality of airbleed tubes each mounted in a substantially radial manner in one of the orifices of the annular support, and a vibration reduction device for reducing vibrations of the airbleed tubes. The device includes a plurality of damping tubes each mounted in one of the orifices of the annular support. The radially inner end of the damping tube encloses a portion of the airbleed tube and delimits an annular space defined therebetween.

4 Claims, 4 Drawing Sheets

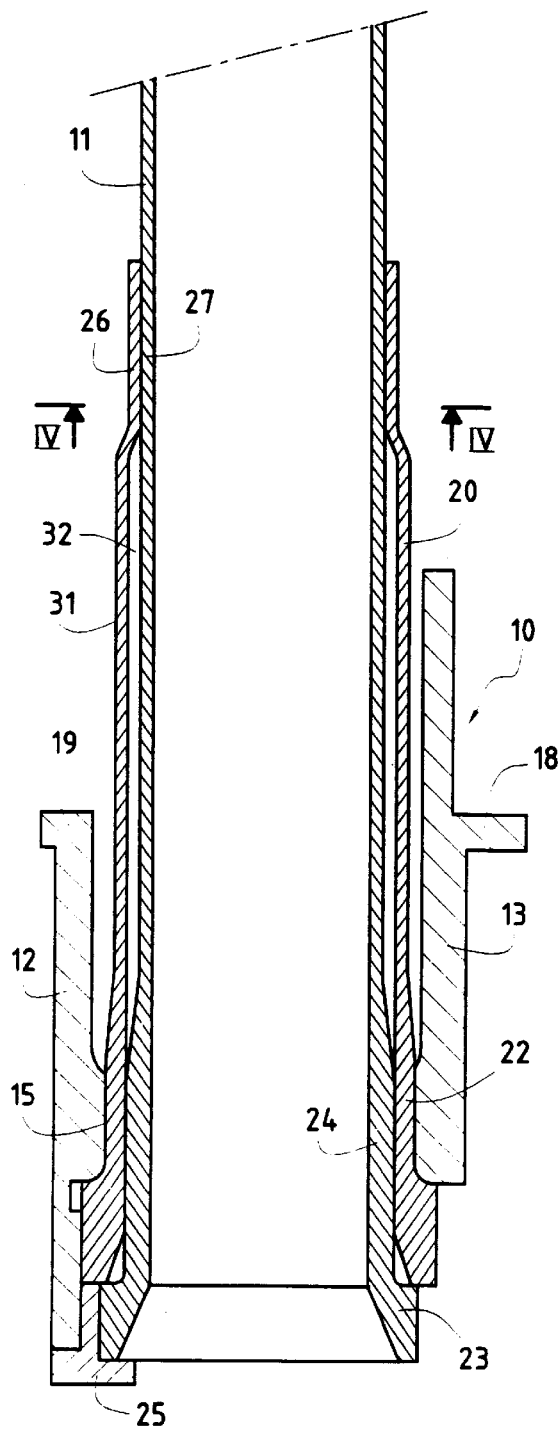
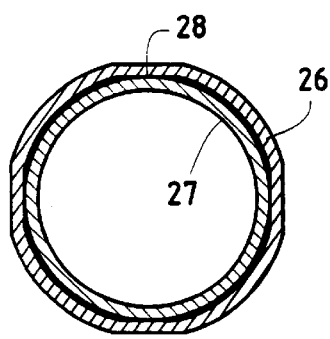
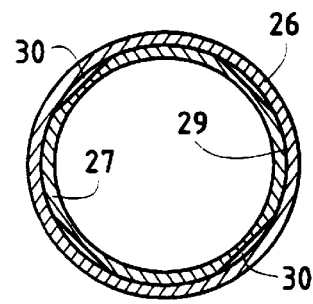
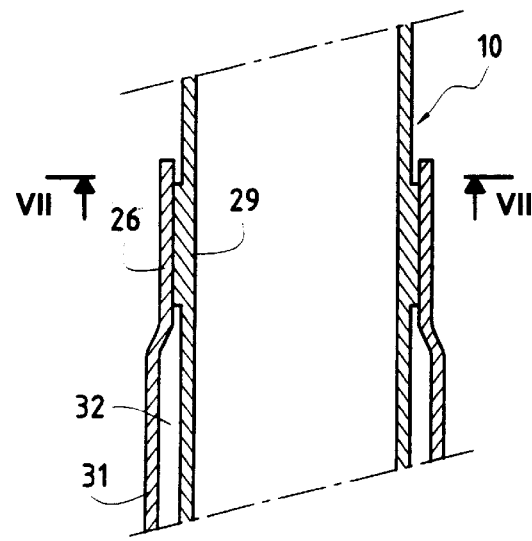

CENTRIPETAL AIR-BLEED SYSTEM

BACKGROUND OF THE INVENTION

The present invention relates to an air bleed system for a compressor of a gas-turbine engine.

More specifically, the present invention relates to a centripetal airbleed system positioned between oppositely opposed first and second disks of a gas-turbine engine compressor. The air bleed system includes an annular support affixed to the first and second disks, and a plurality of airbleed tubes mounted in a substantially radial manner within orifices defined along the periphery of the support. Each tube is arranged with a vibration reduction device that reduces vibrations during operation of the engine.

An air bleed system is proposed in U.S. Pat. No. 5,472,313 wherein a damping tube is inserted within the radially inner part of each airbleed tube. At a radially outer portion, the damping tube is arranged with longitudinal slots defining axial strips which, during gas turbine engine operation, are centripetally urged against the inside wall of the bleed tube. Friction between the inner damping tube strips and the outer airbleed tube dissipates deformation energy and therefore lowers the dynamic stresses in the outer tube.

Through-holes are present at the end of the longitudinal slots and constitute stress concentration zones. This feature requires additional and intricate machining. Further, the service life of such inner damping tubes is less than 100,000 cycles.

The mode 1F frequency of the centripetal airbleed-tube of the GE turbojet engine 90–115B is 950 Hz. The aformentioned engine also includes 12 bleed tubes, and the 8F mode frequency operating at 7,125 rpm is (7,125×8/60=) 950 Hz. This is the same frequency as for the 1F mode.

SUMMARY OF THE INVENTION

One object of the present invention is to lower the dynamic stress in the airbleed tube by dissipating the energy of deformation.

Another object of the present invention is to propose an airbleed system based on centrifugal outflow wherein the device damping the airbleed tube vibrations allows for substantially increasing the frequency of the first bending mode, the so-called 1F mode, in order to eliminate crossing of the 1F mode and drive source.

According to the present invention, there is provided a device for reducing the vibrations of an airbleed tube that includes a damping tube maintained within an annular support orifice and which encloses a radially outer part of an airbleed tube. It follows that the radially inner part of the damping tube encloses a portion of the radially outer part of the airbleed tube. An annular gap is defined between the median zone of the damping tube and the airbleed tube.

The damping of the centripetal airbleed system of the present invention relies on two principles: flexibility exhibited at the contact between the outer damping tube so that the airbleed tube can act as a spring; and the rigidity at the contact dissipates energy as if it were a spring. Moreover, the outer damping tube may be stressed by bending such that the bending strength of the damping tube enables energy dissipation.

The proposed system of the invention allows lowering the dynamic stress in the airbleed tube by dissipating energy of deformation and by an increase in the frequency of the first bending mode, the so-called 1F mode, on account of the increase in equivalent rigidity of the airbleed system.

In addition, the proposed outer damping tube is free of slots and therefor holes at the ends of the slots. As a result, the manufacture of the present invention is easier than the machining of a strip-fitted inner damping tube of the prior art.

In a first embodiment of the present invention, the radially inner end of the damping tube is constricted sufficiently to contact a peripheral wall of the airbleed tube along a plurality of axial zones defined between the damping and airbleed tubes.

In a second embodiment of the present invention, the airbleed tube includes a boss extending from a radially outer surface thereof that engages with the radially inner end of the damping tube. The boss includes a plurality of flat surfaces defined along thereof.

Other advantages and features of the invention are elucidated in the following illustrative description and in relation to the attached drawings.

BRIEF DESCRIPTION OF THE DRAWINGS

FIG. 3 is a radial sectional view of the airbleed system of the centripetal airbleed system;

FIG. 4 is a sectional view taken on line IV—IV of FIG. 3;

FIG. 6 is a detail view of an embodiment variation of the present invention;

FIG. 7 is a sectional view taken on line VII—VII of FIG. 6.

DETAILED DESCRIPTION OF THE PRESENT INVENTION

Figure 1:
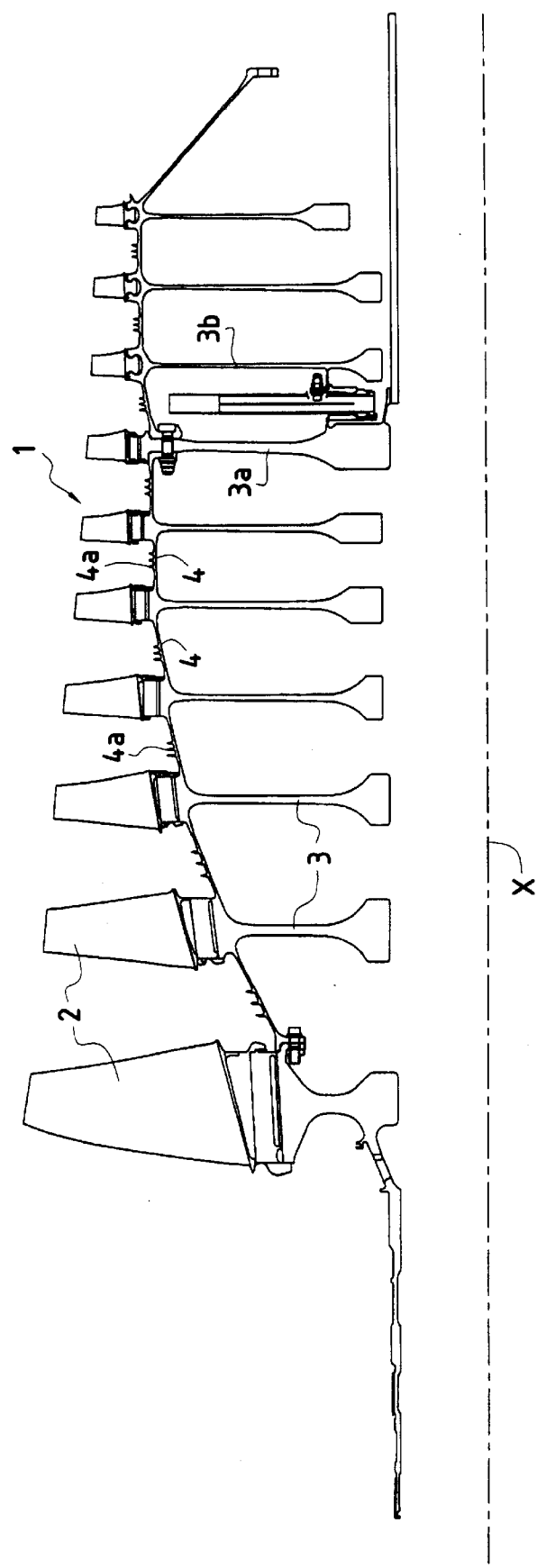
FIG. 1 is a schematic, side elevation of the compressor section with the centripetal airbleed system embodying the present invention.

FIG. 1 shows a high-pressure compressor rotor 1 of a turbojet-engine, having an axis X and including several stages of blades 2 mounted on the periphery of disks 3. Adjacent disks are linked to each other by annular brackets 4 fitted with rubbing fins 4a that seal the inner ends of stationary vane rings of the stator. The stationary vane rings (omitted from FIG. 1) are positioned between the rings of the blades 2.

Air is bled between two disk stages whereby the bled air cools the high-pressure turbine driving the high-pressure compressor 1.

Figure 2:
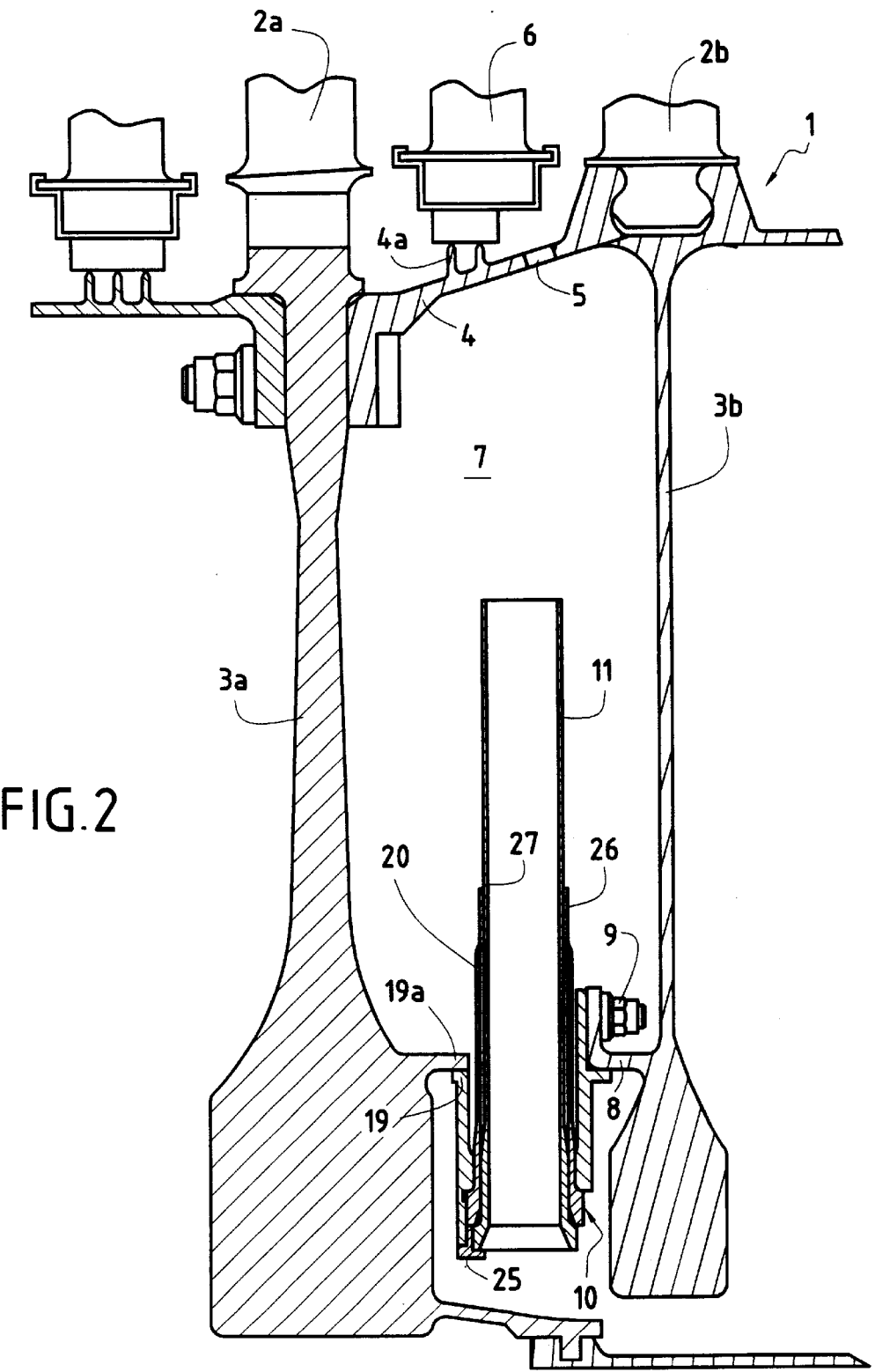
FIG. 2 is a detail of the engine of FIG. 1 showing the centripetal airbleed system between first and second disks.

As shown in FIG. 2, orifices 5 are defined along the annular bracket 4 linking a first, upstream disk 3a and a second, downstream disk 3b. The orifices 5 are defined along the inner ends of the stationary vanes 6 situated between the ring of blades 2a of the first disk 3a and the ring of blades 2b of the second disk 3b.

Air is bled through the orifices 5 into annular space 7 bounded by mutually opposite surfaces of the first and second disks 3a, 3b.

Second disk 3b is fitted along an inside surface thereof with an annular, cross-sectionally L-shaped collar 8 and a ring 10, having an X axis and supporting a plurality of substantially axially configured airbleed tubes 11. Collar 8 of the second disk 3b is affixed to ring 10 with bolts 9.

Figure 5:
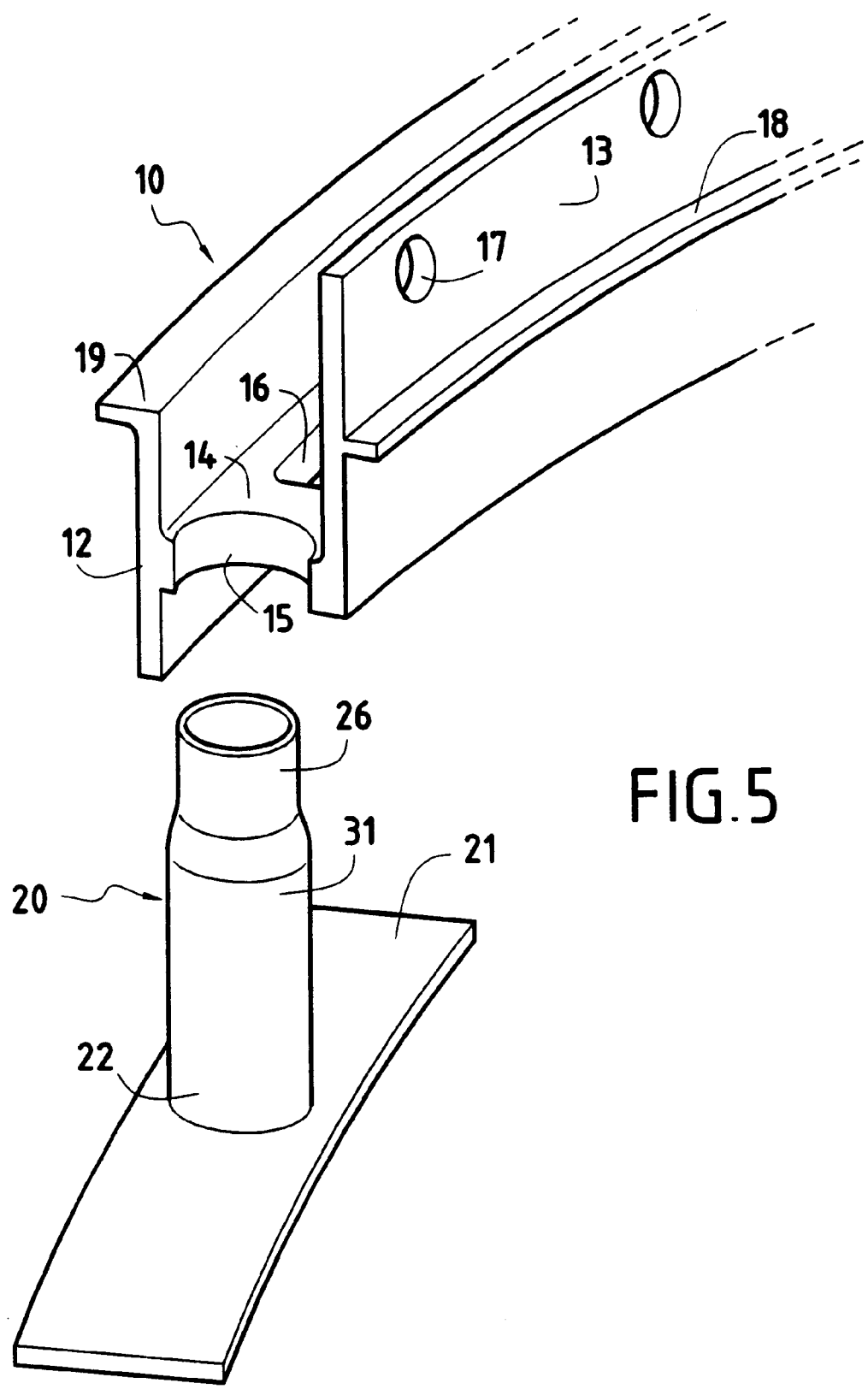
FIG. 5 is a perspective view of the annular support and of an outer damping tube.

As shown in FIG. 5, ring 10 has a forward radial wall 12 and a rear radial wall 13. The walls are connected by a web 14 having a plurality of holes 15 separated by rectangular apertures 16. Orifices 17 defined along rear radial wall 13 receive bolts 9 and an annular rib 18 that engage underneath the collar 8 to permit radially positioning of the ring 10. As illustrated in FIG. 2, forward radial wall 12 also is fitted with an annular flange 19 configured in the vicinity of a corresponding rib 19a of the disk 3a.

As shown in FIG. 3, radially outer part of the airbleed tube 11 is received inside an outer damping tube 20. FIG. 5 shows a rectangular base 21 defined at a radially inside end of outer tube 20, and which rests against the inside surface of the annular web 14 so as to cover at least partly rectangular apertures 16. Radially outer part 22 of the outer tube 20 has a diameter that is substantially the same as that of the holes 15 in web 14 of ring 10. Radially outer part 22 is configured and dimensioned to be tightly inserted into a hole 15 defined along web 14. When all outer tubes 20 have been inserted into holes 15, bases 21 combine to define a ring sealing rectangular apertures 16.

Along radially an outer side of the airbleed tube 11, a bead 23 is defined which is configured to rest against the radially inner end of the outer tube 20. Bead 23 is received by radially inner part 22 of outer tube 20 and constitutes a flared flange 24 having an outside diameter substantially the same as the outside diameter of part 22 such that flared flange 24 can be tightened within part 22. A locking ring 25 is provided and defines a cross-section in the form of an upended T of which the arms rest against the radially inner surfaces of forward radial wall 12 of ring 10 and of airbleed tube 11. Ring 25 is received between the rear surface of radial front wall 12 and beads 23 of the airbleed tubes 11. The arms of ring 25 may differ in length in order to assure a predetermined assembly.

Radially outer end 26 of outer tube 20 contacts a corresponding zone 27 of airbleed tube 11.

In a first embodiment, as shown in FIGS. 3 and 4, end 26 is constricted and fitted with a plurality of axial zones 28 in tight contact with an outer wall of the zone 27. Axial zones 28 illustratively are implemented using jaws clamping end 26 of outer tube 20. FIG. 4 shows four diametrically and pairwise opposite axial zones. The present invention may include numerous axial zones 28.

FIGS. 6 and 7 show a second embodiment of contact between outer tube end 26 and airbleed tube zone 27. In this embodiment, zone 27 includes a boss 29 having a plurality of flat surfaces 30. The outside diameter of boss 29 is substantially the same as the inside diameter of outer tube end 26 and functions to assure firm contact between airbleed tube 11 and outer tube 20 in zone 27.

Regardless of which embodiment is implemented, contact between radially outer end 26 of outer tube 20 and airbleed tube 11 is always maintained and middle zone 31 of the outer tube 20 will not contact the airbleed tube 11 of which an annular space 32 is defined therebetween.

Accordingly, airbleed tube 11 is maintained in place by a radially outer end inside of the outer tube 20 and is further retained with some flexibility by outer tube radially inner end 26. In this contact area, rigidity of the outer tube 20 dissipates energy in a fashion similar to a spring.

Due to annular space 32, outer tube 20 also is subjected to vibrating bending torques. The bending strength of outer tube 20 also allows dissipation of energy. Because of the increase in the equivalent bending strength of the assembly of the two tubes 20 and 11, when compared with the state of the art disclosed in U.S. Pat. No. 5,472,213, the frequency of the first bending mode, called the 1F mode, is substantially increased.

Accordingly, using a damping system having an outer damping tube 20 results in increasing the frequency of the 1F mode in stage 6 of a high-pressure compressor of the turbojet engine GE 90–115B, namely from 950 to 1,653 Hz when the length of the tube 20 is 58.1 mm and from 950 to 1,921 Hz when the length of the tube 20 is 45 mm. The modes 1F and 8N no longer cross because the maximum possible frequency of the 8N mode in the high-pressure compressor of GE 90–115B is 1,505 Hz.

It will of course be appreciated that the invention is not confined to the particular embodiment described herein, but is intended to embrace all possible variations which might be made to it without departing from either the scope or spirit of the invention.

We claim:

1. A centripetal-flow airbleed system for a gas-turbine engine having a compressor including first and second disks comprising:

an annular support affixed to said first and second disks and having a plurality of peripherally spaced orifices defined along the radius thereof;

a plurality of airbleed tubes each mounted in a substantially radial manner in one of said orifices of said annular support; and a vibration reducing device including a plurality of damping tubes each mounted in one of said orifices of said annular support and enclosing a radially outer portion of a respective one of said airbleed tubes, a radially inner end of said damping tube enclosing a portion of said airbleed tube and delimiting an annular space defined therebetween.

2. The system of claim 1 wherein said radially inner end of the damping tube is constricted sufficiently to contact a peripheral wall of the airbleed tube along a plurality of axial zones defined therebetween.

3. The system of claim 1 wherein the airbleed tube includes a boss extending from a radially outer surface thereof that engages with said radially inner end of said damping tube.

4. The system of claim 3 wherein the boss includes a plurality of flat surfaces defined along thereof.

* * * * *